H. MOSCHCOWITZ & W. JASPER.
CAR-STARTER.
No. 178,021. Patented May 30, 1876.
Fig. I.
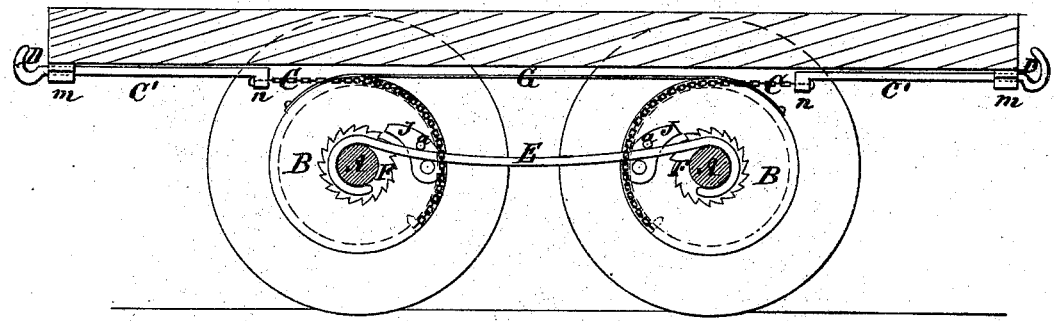
Fig. II.
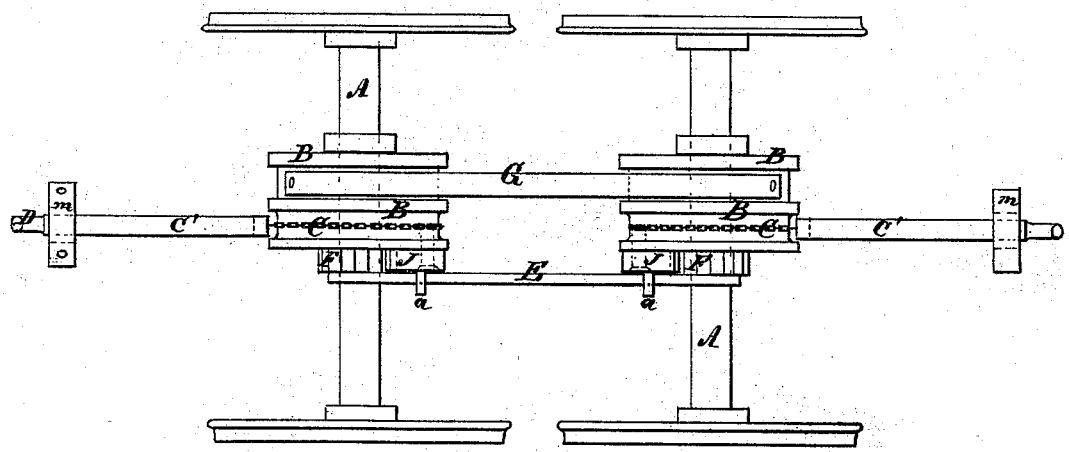
Witnesses.
Earle H. Smith
Wm. Munch
Inventors.
Herman Moschcowitz
Wilhelm Jasper
per Henry E. Roeder
Attorney.

UNITED STATES PATENT OFFICE.

HERMAN MOSCHCOWITZ AND WILHELM JASPER, OF NEW YORK, N. Y.

IMPROVEMENT IN CAR-STARTERS.

Specification forming part of Letters Patent No. 178,021, dated May 30, 1876; application filed November 10, 1875.

*To all whom it may concern:*

Be it known that we, HERMAN MOSCHCOWITZ and WILHELM JASPER, both of the city of New York, in the State of New York, have invented a new and Improved Car-Starter, of which the following is a specification:

In the accompanying drawing, Figure I represents a longitudinal section of a car-truck embodying our invention. Fig. II is a plan of the same.

Upon the axles A A loose pulleys or wheels B B are placed, running freely between suitable collars, around which said pulleys or wheels the draft-chains C C, running to the front and back of the car, are attached. The ends of these chains are attached to bars C' C', terminating in suitable hooks D D, to which the horses are fastened in the usual manner. Upon the axles A A a bar, E, is placed, for the purpose hereafter described. Against one side of the wheel or pulley B a ratchet-wheel, F, is arranged, firmly attached to the axle A, and a pawl, J, attached to the side of the loose pulley B, is arranged to work in the teeth of said ratchet-wheel F. The pawl J is provided with a projecting pin, a, which, upon coming in contact with the bar E, will throw said pawl out of the teeth of the ratchet-wheel F, and at the same time stop the motion of the pulley B. The pulleys or wheels B B are connected by an india-rubber band, G, or any other suitable spring acting in the same manner may be arranged, whereby the wheel is moved back until stopped by the pin a coming in contact with the bar E, as soon as the chain C is not acted upon.

When the car is to be started, the horses pulling upon the bar C' and chain C will cause the wheel B to turn around, moving thereby the pawl J away from the bar E, when the weight of said pawl will cause the same to fall into the teeth of the ratchet-wheel F, which, being securely fastened to the axle A, will cause the rotation of said axle, and thereby start the car. By this arrangement, it will be perceived, the power applied to the end of the bar C' will be increased in exact proportion with the diameter of the wheel or pulley B, the radius of which will form a lever, on the end of which the power for starting the car is applied. When the axle A has in this manner been turned around about one-third or one-half, and consequently the car has thereby been started, the inner end n of the bar C' will come in contact with guide m, and the power will then be applied direct to the car, in the usual manner, while the pawl J will then be in such a position that it will fall away from the teeth of the ratchet-wheel F. As soon as the car is stopped, and the chain C or bar C' is relieved of any strain or pulling power, the spring G will cause the wheel B to turn back again until stopped by the projection a coming in contact with the bar E, bringing thereby the pawl J in the position ready to act as soon as the car is to be again started.

What we claim as our invention, and desire to secure by Letters Patent, is—

1. In combination with a loose wheel or pulley, B, provided with a pawl, J, having a projecting pin, a, the bar E, placed upon the axles of a street-car, arranged and operating in the manner and for the purpose substantially as set forth.

2. The combination of the axle A, ratchet-wheel F, loose pulley B, pawl J, with projecting pin a, bar E, spring G, chain C, bar C', with projection n, and guide-piece m, attached to the body of the car, the whole being arranged and operating in the manner and for the purpose substantially as set forth and described.

HERMAN MOSCHCOWITZ.
WILHELM JASPER.

Witnesses:
SAML. A. PURDY, Jr.,
C. LANSING HASKELL.